(12) United States Patent
Richardson

(10) Patent No.: US 12,244,128 B2
(45) Date of Patent: Mar. 4, 2025

(54) APPARATUS FOR PROVIDING POWER AND PERIPHERAL MOUNTING WITHIN AN IRRIGATION ASSEMBLY

(71) Applicant: Valmont Industries, Inc., Omaha, NE (US)

(72) Inventor: Kirk Richardson, Missouri Valley, IA (US)

(73) Assignee: Valmont Industries, Inc., Omaha, NE (US)

( * ) Notice: Subject to any disclaimer, the term of this patent is extended or adjusted under 35 U.S.C. 154(b) by 417 days.

(21) Appl. No.: 17/717,231

(22) Filed: Apr. 11, 2022

(65) Prior Publication Data

US 2022/0352700 A1 Nov. 3, 2022

Related U.S. Application Data

(60) Provisional application No. 63/181,999, filed on Apr. 30, 2021.

(51) Int. Cl.
*H02G 3/02* (2006.01)
*H04L 12/10* (2006.01)
*A01G 25/09* (2006.01)

(52) U.S. Cl.
CPC .............. *H02G 3/02* (2013.01); *H04L 12/10* (2013.01); *A01G 25/092* (2013.01)

(58) Field of Classification Search
None
See application file for complete search history.

(56) References Cited

U.S. PATENT DOCUMENTS

| | | | | |
|---|---|---|---|---|
| 3,974,845 | A * | 8/1976 | Indresaeter | A01G 25/09 239/731 |
| 11,490,576 | B2 * | 11/2022 | Sanders | B29C 66/51 |
| 11,800,861 | B2 * | 10/2023 | Kastl | A01C 21/005 |
| 11,808,567 | B1 * | 11/2023 | Toman | A01G 25/092 |
| 11,868,100 | B2 * | 1/2024 | LaRue | A01G 25/167 |
| 11,913,536 | B2 * | 2/2024 | Dillon | F16K 17/18 |
| 2019/0297796 | A1 * | 10/2019 | Gerdes | A01G 25/167 |
| 2020/0404835 | A1 * | 12/2020 | Kastl | A01B 79/005 |

* cited by examiner

*Primary Examiner* — Courtney L Smith
(74) *Attorney, Agent, or Firm* — Milligan PC LLO

(57) ABSTRACT

The present invention provides the present invention provides a power and data distribution system which includes an adjustable surface for mounting device peripherals such as sensors, lights, solar panels and the like. According to a first preferred embodiment, an exemplary system includes: a distribution cord which includes a power cord and a data cord; and a connection hub which is located along a length of the distribution cord. According to a further preferred embodiment, the connection hub includes a power outlet and a data outlet which are electrically connected to the distribution cord. According to a further preferred embodiment, the present invention further includes a peripheral securing attachment which attaches to an irrigation span and which includes a peripheral rail, a central cord tunnel and a lower securing surface.

13 Claims, 6 Drawing Sheets

APPARATUS FOR PROVIDING POWER AND PERIPHERAL MOUNTING WITHIN AN IRRIGATION ASSEMBLY

RELATED APPLICATIONS

The present application claims priority to U.S. Provisional Application No. 63/181,999 filed Apr. 30, 2021.

BACKGROUND AND FIELD OF THE PRESENT INVENTION

Field of the Present Invention

The present invention relates generally to irrigation management and, more particularly, to an apparatus for providing power and peripheral mounting surfaces for an irrigation assembly.

Background of the Invention

Modern center pivot and linear irrigation systems generally include interconnected conduits and spans (e.g., irrigation spans) attached to one or more tower structures which support and move the conduits during irrigation. In turn, the conduits are further attached to sprinkler/nozzle systems which spray water (or other applicants) in a desired pattern. In these modern irrigation systems, a significant number of powered elements are used to control various aspects of irrigation. This requires providing power and control signals to a variety of sensors, sprayers, drive control systems, motors, transducers and a variety of other systems.

At the same time, there is a need to provide power and data to various peripherals used by the irrigation span which are not included in the central power and control systems of the present invention. At present, the addition of any device or peripheral to the irrigation spans requires an electrician or similar expert to splice into the power and control systems of the irrigation system. Due to the length of many irrigation machines (between 0.25 and 0.5 miles), this type of splicing can become very costly. Additionally, this type of splicing creates physical weaknesses within the power and data systems because of the physical cutting of wires. Additionally, the addition of new peripherals can create overloaded power circuits which are difficult to individually control. For data circuits, the addition of additional wires and peripherals can also create electrical noise which is difficult to isolate and remove from the data system.

To overcome the limitations of the prior art, a system and apparatus is needed which can provide power and/or data ports along the length of an irrigation span without affecting the main power and data control systems of the irrigation assembly. Additionally, an apparatus is needed which helps to both secure the power and data ports while also allowing for the attachment of peripherals.

SUMMARY OF THE PRESENT INVENTION

To address the shortcomings of the prior art, the present invention provides a power and data distribution system which includes an adjustable surface for mounting device peripherals such as sensors, lights, solar panels and the like.

According to a first preferred embodiment, an exemplary system includes: a distribution cord which includes a power cord and a data cord; and a connection hub which is located along a length of the distribution cord.

According to a further preferred embodiment, the connection hub includes a power outlet and a data outlet which are electrically connected to the distribution cord.

According to a further preferred embodiment, the present invention further includes a peripheral securing attachment which attaches to an irrigation span and which includes a peripheral rail, a central cord tunnel and a lower securing surface.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, a variety of changes and modifications can be made within the scope of the invention without departing from the spirit thereof.

The accompanying drawings, which are incorporated in and constitute part of the specification, illustrate various embodiments of the present invention and together with the description, serve to explain the principles of the present invention.

DESCRIPTION OF THE PREFERRED EMBODIMENTS

Figure 1:
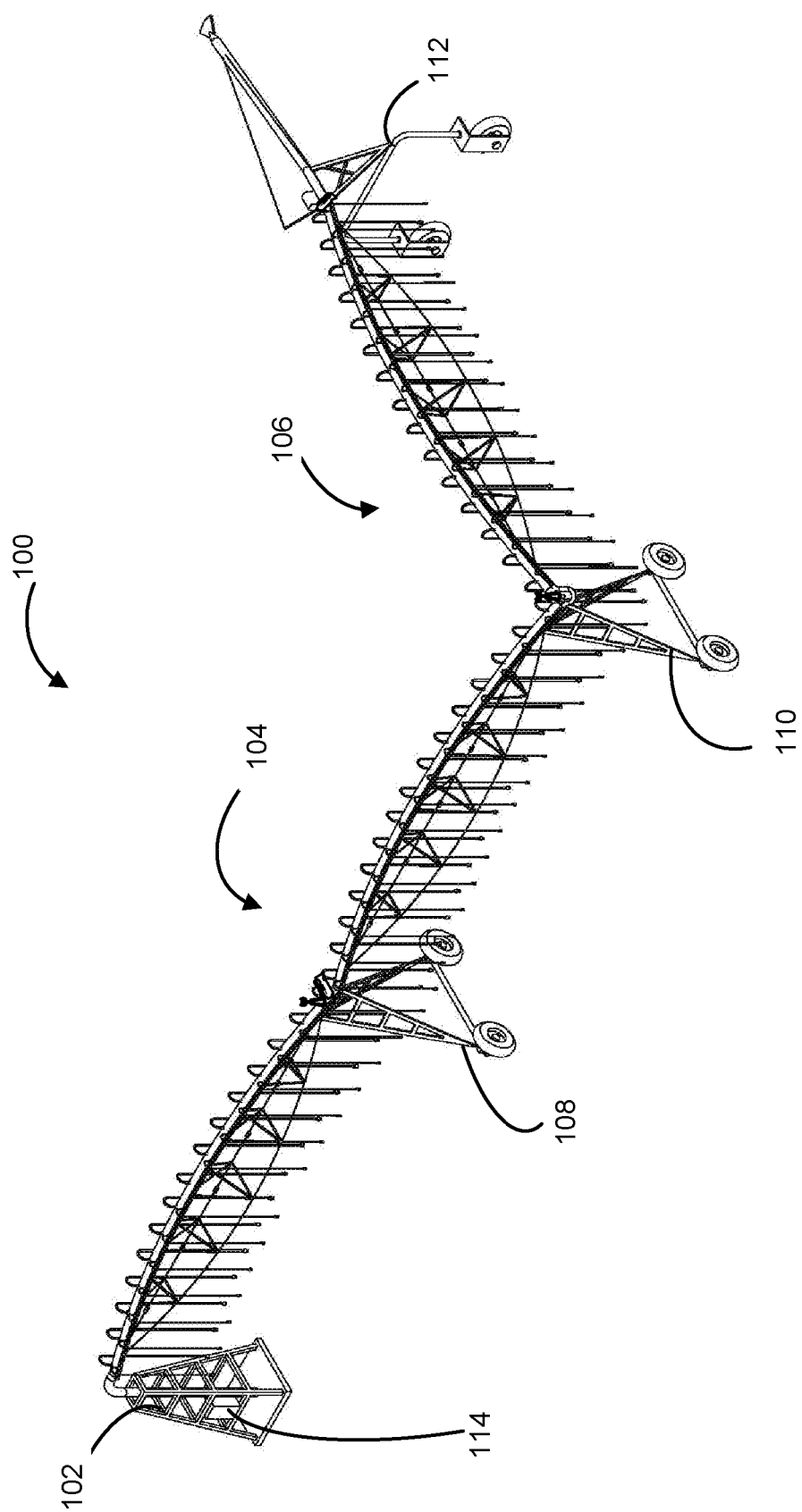
FIG. 1 shows an exemplary irrigation system as known in the prior art.

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art. The descriptions, embodiments and figures used are not to be taken as limiting the scope of the claims.

Where the specification describes advantages of an embodiment or limitations of other prior art, the applicant does not intend to disclaim or disavow any potential embodiments covered by the appended claims unless the applicant specifically states that it is "hereby disclaiming or disavowing" potential claim scope. Moreover, the terms "embodiments of the invention", "embodiments" or "invention" do not require that all embodiments of the invention include the discussed feature, advantage or mode of operation, nor that it does not incorporate aspects of the prior art which are sub-optimal or disadvantageous.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Additionally, any examples or illustrations given herein are not to be regarded in any way as restrictions on, limits to, or express definitions of, any term or terms with which they are utilized. Instead, these examples or illustrations are to be regarded as illustrative only.

As used herein, the singular forms "a", "an" and "the" are intended to include the plural forms as well, unless the context clearly indicates otherwise. Additionally, the word "may" is used in a permissive sense (i.e., meaning "having the potential to'), rather than the mandatory sense (i.e. meaning "must"). Further, it should also be understood that throughout this disclosure, unless logically required to be otherwise, where a process or method is shown or described, the steps of the method may be performed in any order (i.e., repetitively, iteratively or simultaneously) and selected steps may be omitted. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many of the embodiments described herein are described in terms of sequences of actions to be performed by, for example, elements of a computing device. It should be recognized by those skilled in the art that the various sequences of actions described herein can be performed by specific circuits (e.g., application specific integrated circuits (ASICs)) and/or by program instructions executed by at least one processor to enable the at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter.

The terms "program," "computer program," "software application," "module" and the like as used herein, are defined as a sequence of instructions designed for execution on a computer system. In addition, for each of the embodiments described herein, the corresponding form of any such embodiment may be described herein as, for example, "a computer configured to" perform the described action. Any such computer, program, computer program, module or software application may include a subroutine, a function, a procedure, an object implementation, an executable application, an applet, a servlet, a source code, an object code, a shared library, a dynamic load library and/or other sequence of instructions designed for execution on a computer system. A memory or data storage means, as defined herein, includes many different types of computer readable media including volatile storage such a RAM, buffers, cache memory, and network circuits.

Referring now to FIG. 1, an exemplary center pivot irrigation system for use with the present invention is provided. As shown, irrigation machines 100 commonly include a main section assembly 104 which may include any number of interconnected spans supported by one or more intermediate drive towers 108 and a Last Regular Drive Unit ("LRDU") 110. The LRDU 110 is normally a motorized drive tower which rotates the main section assembly 104 around the center pivot 102. The corner span 106 as shown is supported and moved by a corner/steerable drive unit 112 (SDU). Further, one or more control panels/boxes 114 are generally provided to enclose on-board computer elements.

Figure 2:
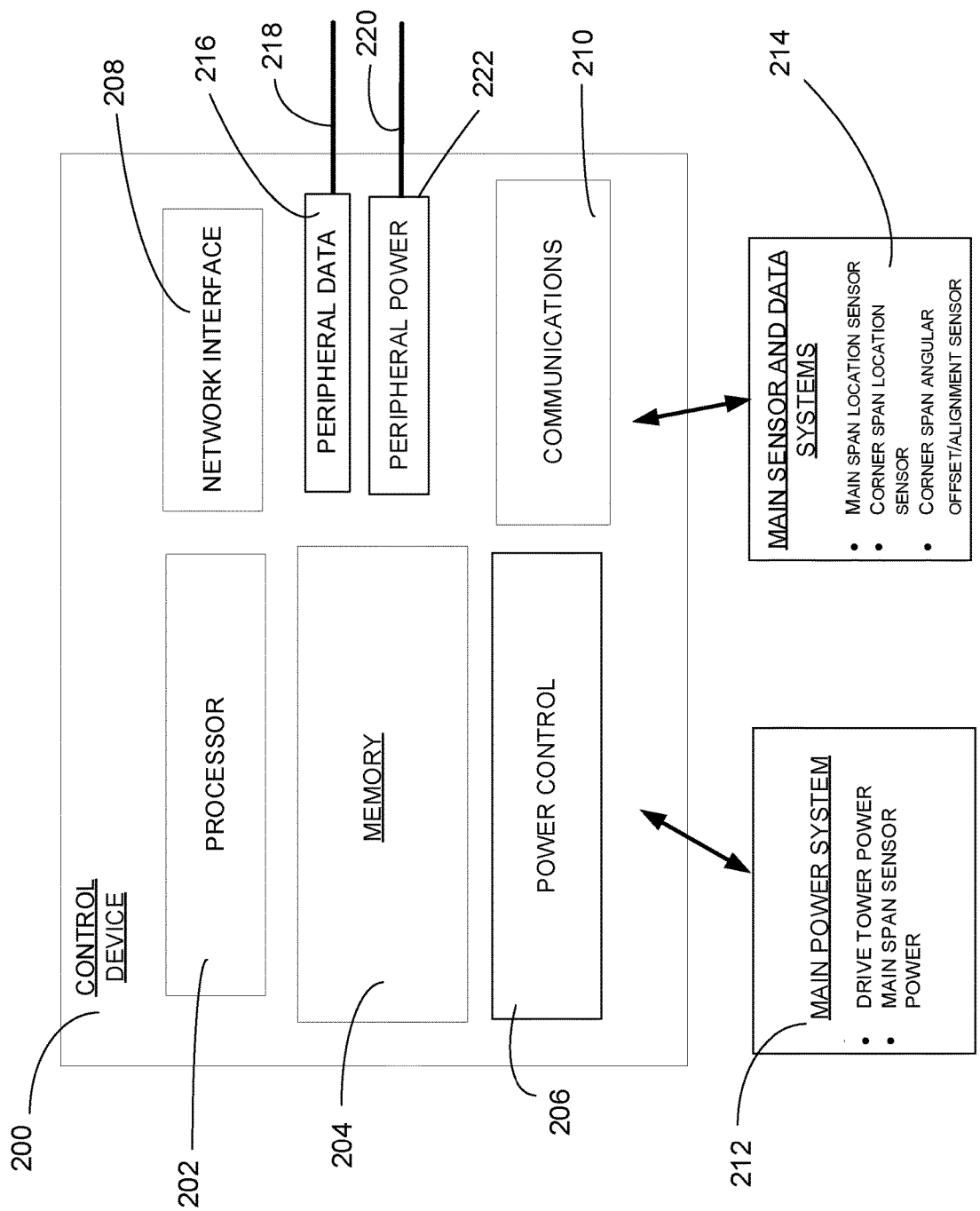
FIG. 2 shows a block diagram illustrating the exemplary processing architecture of a control device in accordance with a first preferred embodiment of the present invention.

With reference now to FIG. 2, an exemplary control device 200 which represents functionality to control one or more operational aspects of the irrigation system 100 will now be discussed. As shown, an exemplary control device 200 preferably includes a processor 202, a memory 204, and a network interface 208. The processor 202 preferably may provide processing functionality for the control device 200 and may include any number of processors, micro-controllers, or other processing systems.

The processor 202 may further execute one or more software programs that implement techniques described herein. The memory 204 may be an example of tangible computer-readable media that provides storage functionality to store various data associated with the operation of software programs and code segments mentioned above, or other data to instruct the processor 202 and other elements of the control device 200 to perform the steps described herein. The network interface 208 preferably provides functionality to enable the control device 200 to communicate with one or more networks through a variety of components such as wireless access points, transceivers and so forth, and any associated software employed by these components (e.g., drivers, configuration software, and so on).

In implementations, the controller 200 may include a power control module 206 which controls and links to a primary power system 212 for distributing and controlling electrical power throughout an irrigation assembly. The controller 200 may preferably also include a data communications module 210 for linking to a set of primary sensors and data links 214 throughout the irrigation assembly.

According to a further preferred embodiment, the controller 200 of the present invention may preferably further include a peripheral data input/module 216 for transmitting and receiving data from a peripheral data line 218 as discussed further below. Additionally, the controller 200 may further include a peripheral power output/module 222 for transmitting power along a peripheral power line 220 as discussed further below.

Figure 3:
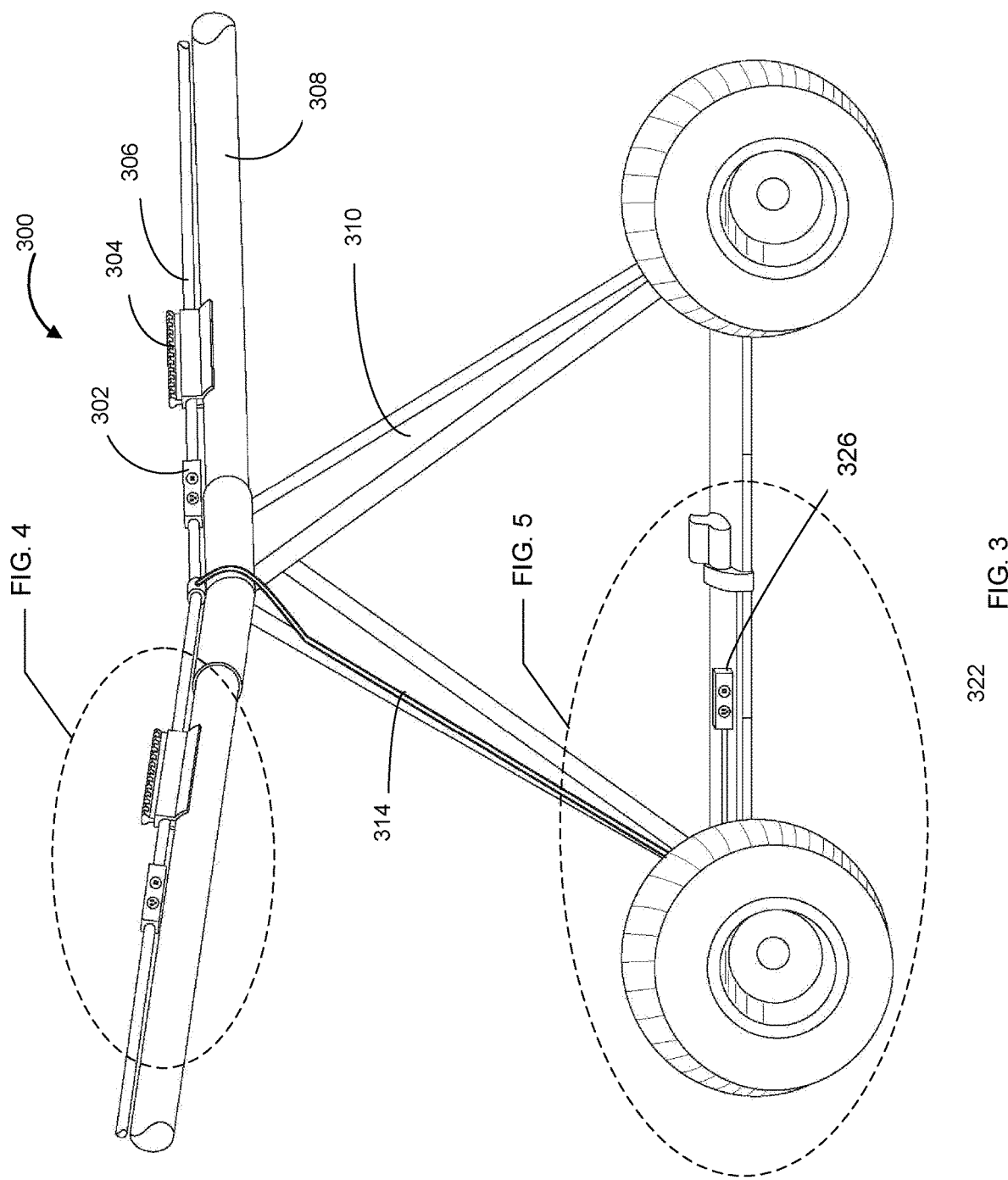
FIG. 3 is a perspective view of an exemplary peripheral distribution assembly in accordance with a first preferred embodiment of the present invention.
Figure 4:
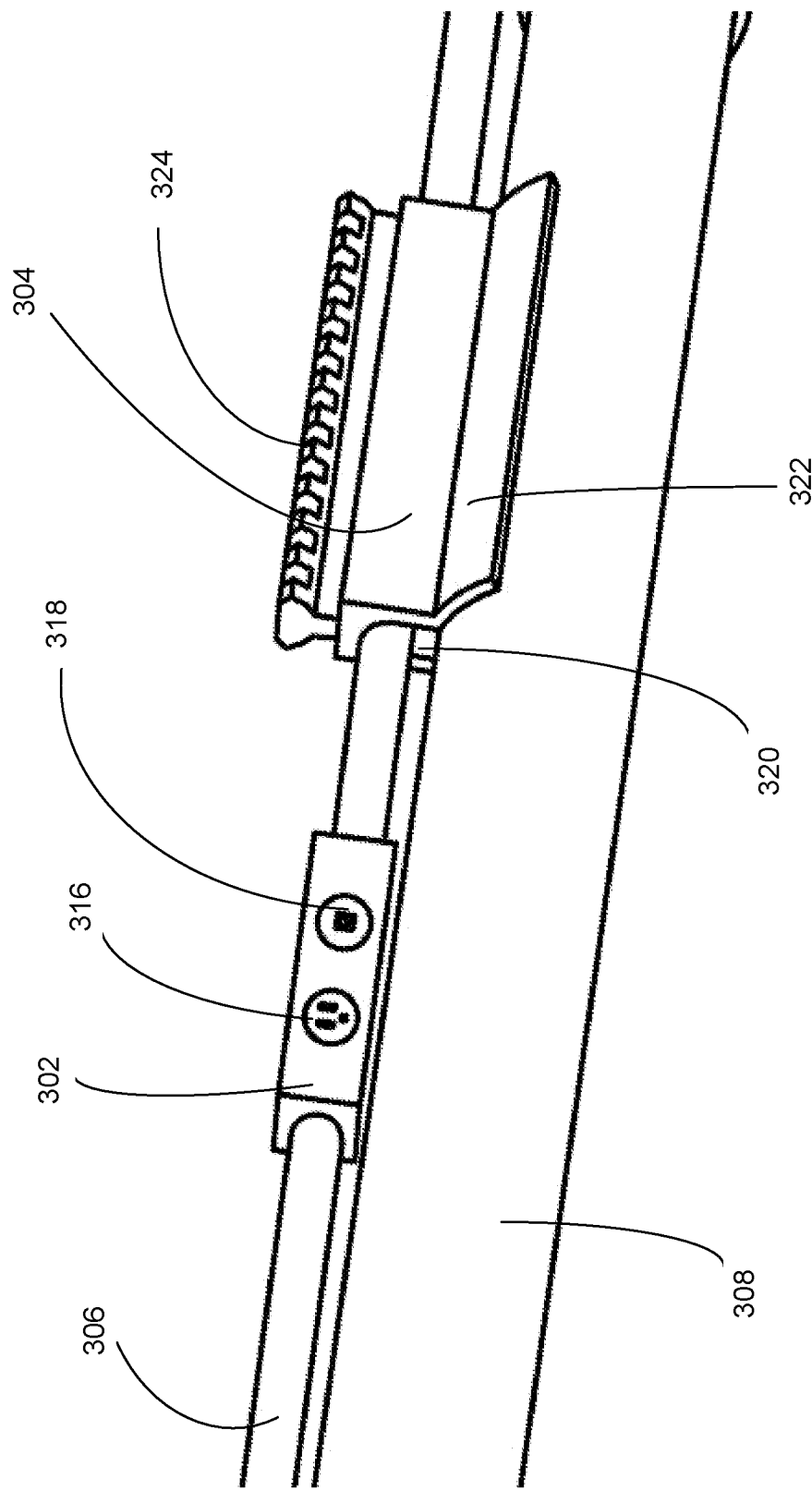
FIG. 4 is a perspective view of a first section of the peripheral distribution assembly as indicated in FIG. 3.
Figure 5:
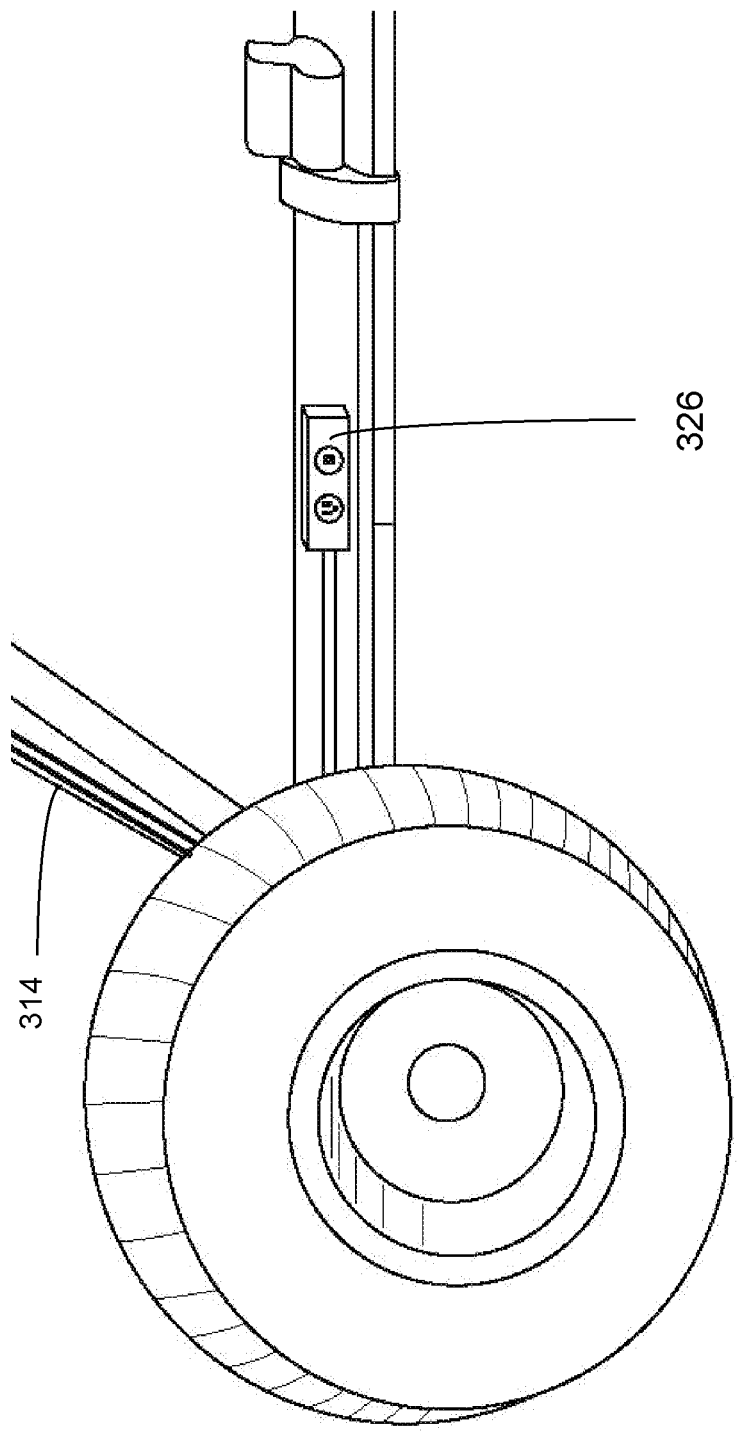
FIG. 5 is a perspective view of a second section of the peripheral distribution assembly as indicated in FIG. 3.

With reference now to FIGS. 3-5, an exemplary peripheral distribution assembly 300 in accordance with the present invention shall now be discussed. As shown in FIG. 3, a first preferred embodiment of the present invention may preferably include one or more connection hubs 302 and one or more peripheral securing attachments 304. Additionally, the assembly 300 may include one or more power/data cords 306 which are designed to run along and/or attach to the outside surface of a given irrigation span 308.

According to preferred embodiments, the power/data cord 306 may preferably include a single power line, a single data line, or a combination of a power line and a data line which may be insulated together in a single cord or separately as two separate cords. According to a further alternative embodiment, the power/data cord 306 of the present invention may alternatively be a single power cord enclosing a single power line which is capable of delivering both power and data communications via power-line carrier-controlled devices which may be attached at the terminal ends of each power line. According to a further alternative embodiment, the power/data cord 306 may include a single data cable which is used for providing power over Ethernet (PoE) as discussed further below. Additionally, the exemplary peripheral distribution assembly 300 may also include and/or connect to one or more power/data cord branches 314 which may connect to and travel alone the framing of a given drive tower 310 or other structural element of the irrigation system.

With reference now to FIG. 4, the connection hubs 302 may preferably be interspersed between various lengths of the power/data cord(s) 306. As shown, each connection hub 302 may preferably include one or more power outlets 316 and/or one or more data outlets 318. The power outlets 316 may preferably include a connection point for transferring any of a variety of voltages from an attached power line 218 (shown in FIG. 2) to connected peripheral devices. Likewise, the data outlets 318 may conform to any of a variety of data transmission standards and may include a connection point for transferring data from an attached data line 220 (shown in FIG. 2). According to a preferred embodiment, the data outlets 318 may be Ethernet compatible. For example, the data outlets 318 may be compatible with Category 5-6 Ethernet data cables and cable plugs. Additionally, as discussed above, the connection hubs 302 may include splitter and filtering elements to receive both power and data from a single power line. Additionally, the connection hubs 302 may include splitter and filtering elements to allow both power and data to be received over a single data line (e.g., power over Ethernet (PoE).

According to further alternative embodiments, the power/data cord 306 may also include a chase (i.e., a tube or shell) which encloses the power/data cords 306 or other individual line elements.

Referring again to FIG. 4, the system of the present invention may also include a peripheral securing attachment 304. Preferably, the peripheral securing attachment 304 may include a peripheral rail 324 which allows for securely mounting one or more peripheral attachments (not shown). Additionally, the peripheral securing attachment 304 may also include a lower securing surface 322 which may connect to an irrigation span 306 via a magnetic layer of material attached to or integrated within the lower securing surface 322. Alternatively, the lower securing surface 322 may be connected to the span 306 using adhesives, clamps, or the like. As further shown, the peripheral securing attachment 304 may also include a central cord tunnel 320 which preferably acts to secure the power/data cord 306 to the irrigation span 308 while also allowing the power/data cord 306 to pass through the peripheral securing attachment 304. Alternatively, the peripheral securing attachment 304 may act to connect different lengths of power/data cords 306.

Referring now to FIG. 5, a further aspect of the present invention is illustrated. As shown, the system of the presents invention may also include branch power/data cords 314 which can run vertically down to connection points along one or more drive towers. As shown, these branch power/data cords 314 may provide power/data to one or more lower connection hubs 326.

Figure 6:
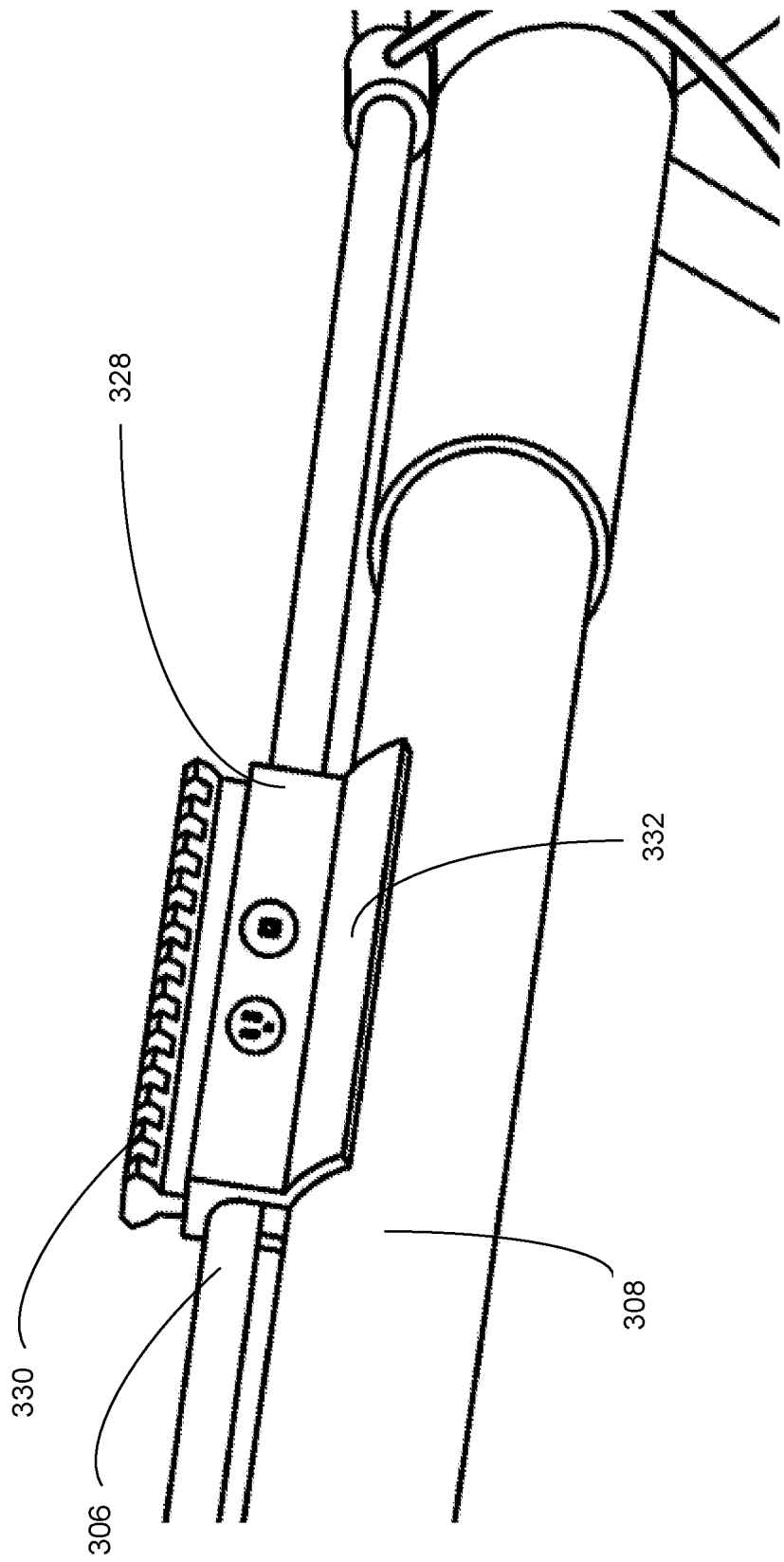
FIG. 6 is a perspective view of an alternative embodiment of the peripheral distribution assembly of the present invention.

Referring now to FIG. 6, an exemplary connection hub 328 of the present invention may include various other elements of the present invention. For example, the connection hub 328 may include a peripheral rail 330 and a lower securing surface 332 along with data and power outlets as discussed above. In this way, the connection hub 328 may provide power and data, while also securing the power/data cords 306 and providing a peripheral connection rail 330.

While the above descriptions regarding the present invention contain much specificity, these should not be construed as limitations on the scope, but rather as examples. Many other variations are possible. For example, although the present system is discussed with regards to a self-propelled irrigation system, other irrigation systems may also incorporate the present invention without limitation. Further, the methods of the present invention may be used to control any number of sprinklers either individually or in groups. Accordingly, the scope of the present invention should be determined not by the embodiments illustrated, but by the appended claims and their legal equivalents.

What is claimed is:

1. An apparatus for providing power within an irrigation system having at least one irrigation span and one drive tower, the apparatus comprising:
    a power control module, wherein the power control module is configured to control power distributed within the irrigation system;
    a signal control module; where the signal control module is configured to send and receive data within the irrigation system;
    a distribution cord, wherein the distribution cord comprises at least a first power line; wherein the first power line is electrically linked at a first end to the power control module; wherein the first power line is enclosed within the distribution cord;
    a second data line; wherein the second data line is electrically linked to the signal control module; wherein the second data line is enclosed within the distribution cord; wherein the second data line is configured to run within the distribution cord along the outside surface of the first irrigation span;
    a connection hub, wherein the connection hub is located along a length of the distribution cord; wherein the connection hub comprises a first power outlet and a second data outlet; wherein the first power outlet is electrically linked to the first power line; wherein the second data outlet is electrically linked to the second data line; and
    a peripheral securing attachment, wherein the peripheral securing attachment comprises a central cord tunnel and a lower securing surface; wherein the peripheral securing attachment houses at least a portion of the distribution cord within the central cord tunnel.

2. The apparatus of claim 1, wherein the lower securing surface comprises a magnetic layer of material.

3. The apparatus of claim 2, wherein the peripheral securing attachment further comprises a peripheral rail; wherein the peripheral rail is secured above the central cord tunnel.

4. The apparatus of claim 3, wherein the connection hub is housed within the central cord tunnel.

5. The apparatus of claim 4, wherein the connection hub comprises a second power outlet.

6. The apparatus of claim 5, wherein the first power line comprises an electrical line configured to carry power and data communications between power-line carrier-controlled devices.

7. The apparatus of claim 6, wherein the electrical line comprises an Ethernet data cable which is configured to carry power over Ethernet (PoE).

8. The apparatus of claim 1, wherein the apparatus further comprises: a peripheral data input module for transmitting and receiving data from a peripheral data line.

9. The apparatus of claim 8, a peripheral distribution assembly; wherein the peripheral distribution is electrically linked to a peripheral data input module.

10. The apparatus of claim 9, wherein the peripheral distribution assembly comprises at least a first data cord branch; wherein the first data cord branch is configured to run along one or more framing elements of the first drive tower.

11. The apparatus of claim 10, wherein the apparatus further comprises: a peripheral data input module for transmitting and receiving data from a peripheral data line.

12. The apparatus of claim 11, wherein the peripheral distribution assembly is electrically linked to a peripheral data input module.

13. The apparatus of claim 12, wherein the peripheral distribution assembly comprises at least a first data cord branch; wherein the first data cord branch is configured to run along the framing of the first drive tower.

* * * * *